US009635712B2

(12) United States Patent
Yang et al.

(10) Patent No.: US 9,635,712 B2
(45) Date of Patent: Apr. 25, 2017

(54) NEAR-INFRARED CONDENSING HEATING UNIT, NEAR-INFRARED CONDENSING HEATER USING THE SAME, AND METHOD FOR FORMING PANEL USING THE SAME

(71) Applicants: Hyundai Motor Company, Seoul (KR); Korea Advanced Institute of Science and Technology, Daejeon (KR)

(72) Inventors: Woo Ho Yang, Incheon (KR); Dong-Yol Yang, Daejeon (KR); Eun-Ho Lee, Daejeon (KR); June-Sun Hwang, Daejeon (KR); Chang-Whan Lee, Daejeon (KR)

(73) Assignees: HYUNDAI MOTOR COMPANY, Seoul (KR); Korea Advanced Institute of Science and Technology, Daejeon (KR)

( * ) Notice: Subject to any disclaimer, the term of this patent is extended or adjusted under 35 U.S.C. 154(b) by 641 days.

(21) Appl. No.: 14/054,455

(22) Filed: Oct. 15, 2013

(65) Prior Publication Data

US 2014/0294369 A1 Oct. 2, 2014

(30) Foreign Application Priority Data

Apr. 2, 2013 (KR) ........................ 10-2013-0036029

(51) Int. Cl.
*F21V 7/00* (2006.01)
*G02B 17/00* (2006.01)
*H05B 3/00* (2006.01)

(52) U.S. Cl.
CPC ..... *H05B 3/0061* (2013.01); *H05B 2203/032* (2013.01)

(58) Field of Classification Search
None
See application file for complete search history.

(56) References Cited

U.S. PATENT DOCUMENTS 2,317,426 A * 4/1943 Wilson ...................... F26B 3/30 126/92 A
3,398,272 A * 8/1968 Elmer ....................... F21V 7/04 362/296.07
3,494,693 A * 2/1970 Elmer .................... G03B 21/20 353/55
3,679,893 A * 7/1972 Shemitz .................... F21V 7/09 362/345

(Continued)

FOREIGN PATENT DOCUMENTS

EP 0813034 A2 12/1997
JP 2001314923 11/2001

(Continued)

*Primary Examiner* — Thor Campbell
(74) *Attorney, Agent, or Firm* — McDermott Will & Emery LLP

(57) ABSTRACT

A near-infrared condensing heating unit includes a frame having an open side at a side and a seat inside, and a reflecting plate disposed in the seat of the frame having an opening corresponding to the open side, and an extended semi-elliptic cross-section along an elliptic line. The near-infrared condensing heating unit further includes a lamp disposed inside the reflecting plate, with both ends mounted on the frame through sockets.

13 Claims, 7 Drawing Sheets

(56) References Cited

U.S. PATENT DOCUMENTS

| | | | | | |
|---|---|---|---|---|---|
| 3,786,247 | A * | 1/1974 | Eilert | G03B 15/00 | 362/11 |
| 3,950,638 | A * | 4/1976 | Kent | F21V 7/04 | 362/263 |
| 4,229,782 | A * | 10/1980 | Ruud | F21S 6/002 | 362/297 |
| 4,416,068 | A * | 11/1983 | Nilsson | B05D 3/0263 | 118/642 |
| 4,729,075 | A * | 3/1988 | Brass | F21S 8/02 | 362/217.03 |
| 5,075,827 | A * | 12/1991 | Smith | F21V 7/0008 | 362/221 |
| 5,142,459 | A * | 8/1992 | Swarens | F21V 7/0008 | 362/147 |
| 5,226,107 | A * | 7/1993 | Stern | G01M 99/002 | 324/750.07 |
| 5,509,223 | A * | 4/1996 | Jung | G09F 13/14 | 362/297 |
| 5,873,646 | A * | 2/1999 | Fjaestad | F21V 7/005 | 362/125 |
| 5,971,571 | A * | 10/1999 | Rose | F21S 8/043 | 359/853 |
| 6,123,436 | A * | 9/2000 | Hough | G02B 27/0983 | 359/858 |
| 6,454,442 | B1 * | 9/2002 | Changaris | A61N 5/0614 | 362/241 |
| 6,860,618 | B2 * | 3/2005 | Shemitz | F21S 8/04 | 362/225 |
| 7,118,252 | B2 * | 10/2006 | Jung | G09F 13/14 | 362/217.07 |
| 7,133,606 | B1 * | 11/2006 | Elliott | B29B 13/024 | 219/220 |
| 7,600,888 | B1 * | 10/2009 | Miller | A47F 3/001 | 362/217.05 |
| 7,607,794 | B1 * | 10/2009 | Thompson | F21V 7/005 | 362/147 |
| 8,866,051 | B2 * | 10/2014 | Zamzow | B29D 11/00663 | 219/201 |
| 9,410,680 | B2 * | 8/2016 | Ng | F21S 8/026 | |
| 2003/0227527 | A1 * | 12/2003 | Richards | B41J 11/002 | 347/102 |
| 2004/0165391 | A1 * | 8/2004 | Blacker, Jr. | F21V 7/005 | 362/346 |
| 2005/0010090 | A1 * | 1/2005 | Acosta | A61B 5/0075 | 600/316 |
| 2006/0098431 | A1 * | 5/2006 | Kupper | H01K 1/325 | 362/234 |
| 2010/0084574 | A1 * | 4/2010 | Brassell | B29C 71/04 | 250/492.1 |
| 2014/0163664 | A1 * | 6/2014 | Goldsmith | A61B 17/00491 | 623/1.11 |

FOREIGN PATENT DOCUMENTS

| | | |
|---|---|---|
| JP | 2004306510 | 11/2004 |
| JP | 2005-028735 A | 2/2005 |
| JP | 2005-294243 | 10/2005 |
| KR | 2011-0136254 | 12/2011 |

* cited by examiner

NEAR-INFRARED CONDENSING HEATING UNIT, NEAR-INFRARED CONDENSING HEATER USING THE SAME, AND METHOD FOR FORMING PANEL USING THE SAME

CROSS-REFERENCE TO RELATED APPLICATION

This application claims benefit of priority to Korean Patent Application No. 10-2013-0036029 filed in the Korean Intellectual Property Office on Apr. 2, 2013, the entire contents of which are incorporated herein by reference.

TECHNICAL FIELD

The present disclosure relates to a near-infrared condensing heating unit, a near-infrared condensing heater using the same, and a method for forming a panel using the same. More particularly, the present disclosure relates to a near-infrared condensing heating unit that can instantaneously and locally heat a portion by condensing light from a near-infrared lamp using the reflecting plate, a near-infrared condensing heater using the near-infrared condensing heating unit, and a method of forming a panel using the near-infrared condensing heating unit and the near-infrared condensing heater.

BACKGROUND

In general, vehicle manufacturers employ high-strength and light parts to improve fuel efficiency to the vehicles since stronger and lighter materials are increasingly used in the field of vehicle body to satisfy a current social demand.

In general, high tensile strength steel plates having at least 980 MPa are used in order to reduce weight of vehicle materials.

However, the high tensile strength steel plates have poor formability due to stiffness and dimensional variation generated by spring back after forming, such that additional post processes are required.

The formability of the high tensile strength steel plates can be improved by heating a portion of or the entire plates and softening them. The method of forming the softened portion by heating can be done using a press forming process such as warm forming, hot forming, and hot stamping. In general, ultra high tensile strength having 1500 MP or over can be formed.

Therefore, various material heaters have been developed for forming by the press forming process as mentioned above requiring less influence from the forming conditions in order to minimize the cycle time.

The above information disclosed in this Background section is only for enhancement of understanding of the background of the disclosure, and therefore may contain information that does not form the prior art already known in this country to a person of ordinary skill in the art.

SUMMARY

According to an exemplary embodiment of the present disclosure, a near-infrared condensing heating unit may include a frame having an open side at a side and a seat inside. A reflecting plate may be disposed in the seat of the frame, having an opening corresponding to the open side and an extended semi-elliptic cross-section along an elliptic line. A lamp may be disposed inside the reflecting plate with both ends mounted on the frame through sockets.

Fitting grooves may be formed at the frame, along both ends of the open side to fit both ends of the reflecting plate.

Heat dissipation holes may be formed at the frame, through the sides except the open side, to expose the outer side of the reflecting plate.

Connecting holes may be formed at the corners of the front and rear sides of the frame, and the frame may be manufacture in a unit module to be connected by connecting joints through the connecting holes.

The reflecting plate may have a semi-elliptic section disposed in the seat of the frame and an extended section extending along an elliptic line from both ends of the semi-elliptic section. The reflecting plate may form an elliptic line and maximize a light-condensing ratio in a shape further extending from the semi-ellipse.

Surface treatment may be performed on the reflecting plate to increase reflectivity, and may be anodizing.

The reflecting plate may be disposed along an elliptic line to form a light condensing area at the outside of the opening of the reflecting plate and to condense light by reflecting the diffused light from the lamp.

The lamp may be a near-infrared lamp.

According to another exemplary embodiment of the present disclosure, a near-infrared condensing heater may include a near-infrared condensing heating unit having a frame with an open side at a side, a seat inside, and connecting holes at the corners of the front and rear sides. A reflecting plate may be disposed in the seat of the frame, having an opening corresponding to the open side and an extended semi-elliptic cross-section along an elliptic line. A lamp may be disposed inside the reflecting plate, with both ends mounted on the frame through sockets, and connecting joints may connect at least two or more near-infrared condensing heating units through the connecting holes.

The connecting joint may include a first rod having one end fitted in a connection hole formed at one frame, and a second rod having one end fitted in a connection hole formed at another frame. A universal joint may connect the other ends of the first rod and the second rod.

The first rod and the second rod may be thread-fastened to the connecting holes, respectively.

A plurality of near-infrared condensing heating units may be arranged in a straight line or a curved line along a portion to be heated on a material, in accordance with the length, the degree of fitting in the connecting holes, and a joint function of the connecting joints.

A method of forming a panel using a near-infrared condensing heater may include moving a portion to a light condensing area of the near-infrared condensing heater. The portion is locally heated to a predetermined temperature, using near-infrared light. The method further includes supplying the locally heated portion to a press and forming the portion into a predetermined shape.

A light condensing area having high energy density is formed by condensing light from a near-infrared lamp at the outside of a reflecting plate using the reflecting plate disposed along an elliptic line and a portion to be formed of a material. The portion to be formed of the material is then heated at the light condensing area, such that the material can be instantaneously heated.

Since the reflecting plate has an opening with a semi-elliptic section and an extended section extending along an elliptic line at both ends of the semi-elliptic section, formed along an elliptic line, light-condensing density at the light condensing area can be increased. Further, reflectivity can be increased by performing surface treatment of anodizing on the reflecting side of the reflecting plate.

The inside of the reflecting plate freely creates convection with external air through the opening, and the frame is made of an aluminum material having good heat dissipation performance, with the open side formed to expose the outer side of the reflecting plate, thereby preventing overheat of the heater.

The near-infrared condensing heater can be freely arranged along the portion to be formed of the panel by connecting a plurality of near-infrared condensing heating units, using the connecting joints, such that the heater can locally heat a portion having a complicated curve or different specifications.

Further, since the panel is softened by locally heating before the forming process such as the press forming process, formability and the cycle time of the entire process can be improved.

DETAILED DESCRIPTION

Figure 1:
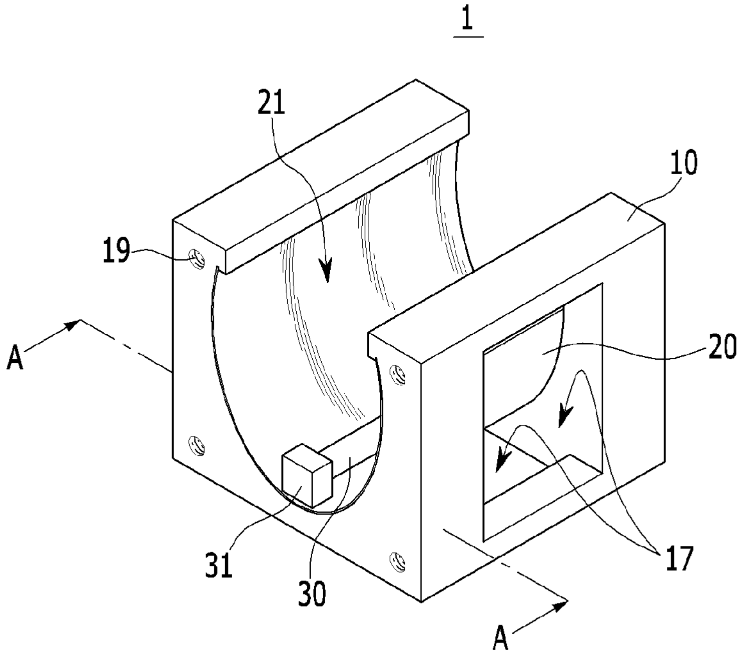
FIG. 1 is a perspective view of a near-infrared condensing heating unit according to an exemplary embodiment of the present disclosure.
Figure 2:
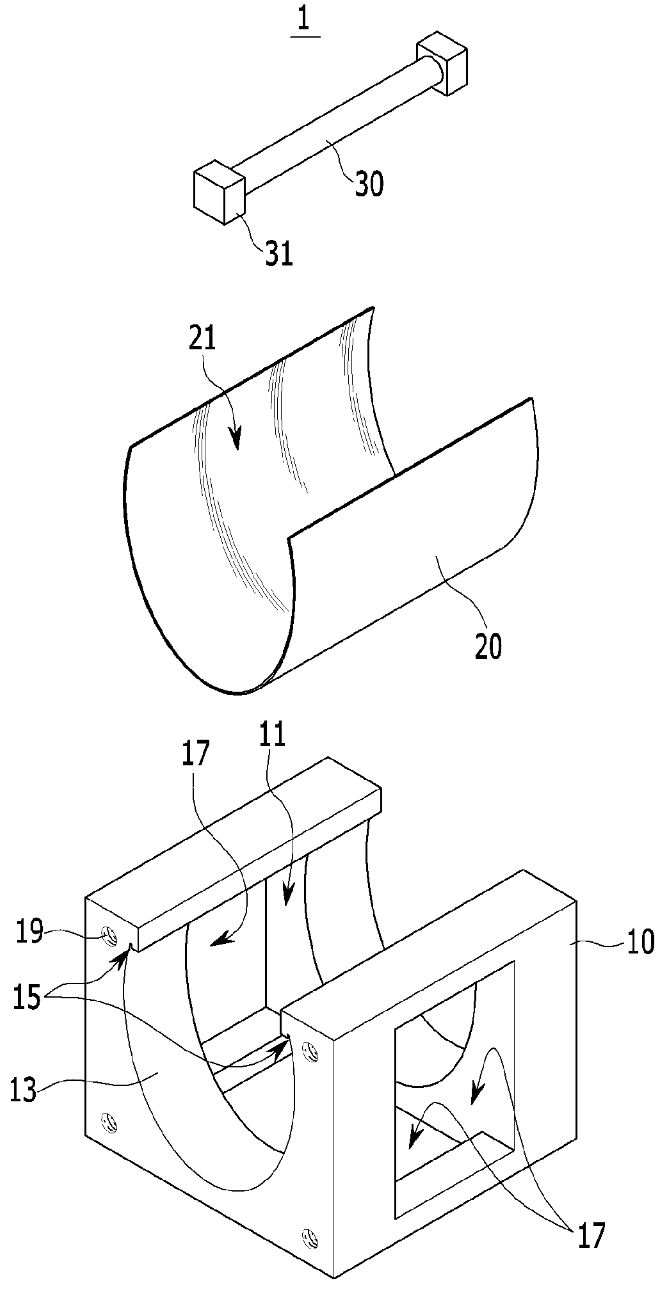
FIG. 2 is an exploded perspective view of the near-infrared condensing heating unit according to an exemplary embodiment of the present disclosure.
Figure 3:
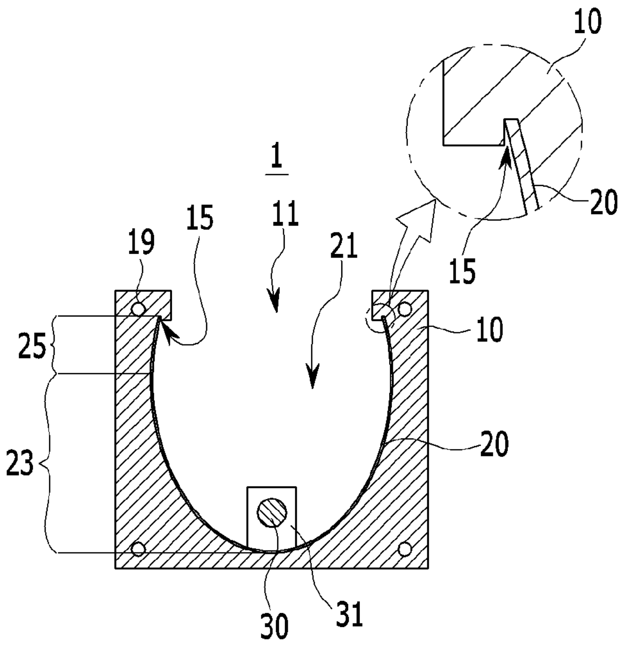
FIG. 3 is a cross-sectional view taken along line A-A in FIG. 1.

Exemplary embodiments of the present disclosure will be described hereinafter in detail with reference to the accompanying drawings.

The sizes and thicknesses of the configurations shown in the drawings are provided selectively for the convenience of description, such that the present disclosure is not limited to those shown in the drawings. Further, parts that are not related to the description are not drawn to make exemplary embodiments of the present disclosure clear.

Referring to FIGS. 1 to 4, a near-infrared condensing heating unit 1 can instantaneously heat a portion by condensing light from a near-infrared lamp using a reflecting plate.

The near-infrared condensing heating unit 1 includes a frame 10, a reflecting plate 20, and a lamp 30. The frame 10 comprises an open side 11 at a side and a seat 13 inside.

The reflecting plate 20 is disposed in the seat 13 of the frame 10 and has an opening 21 corresponding to the open side 11. The lamp 30 is disposed inside the opening 21 of the reflecting plate 20 with both ends mounted on the frame 10 through sockets 31.

The components of the near-infrared condensing heating unit 1 are described hereafter in more detail.

The frame 10 may be a rectangular structure with the open side 11, and the seat 13 supports the outer side of the reflecting plate 20. The frame 10 may not necessarily be a rectangular structure but may be formed in various shapes, if necessary.

Fitting grooves 15 are formed at the frame 10 along both ends of the open side 11 to fit both ends of the reflecting plate 20.

Heat dissipation holes 17 are formed at the frame 10 through the sides except the open side 11 to expose the outer side of the reflecting plate 20. The heat dissipation holes 17 may increase the cooling performance of the reflecting plate 20, thus, increasing temperature while the light from the lamp 30 is reflected and condensed and saving the material and the manufacturing cost of the frame 10.

Connecting holes 19 are formed at the corners of the front and rear sides of the frame 10. The frame 10 is manufactured in a unit module to be connected by connecting joints through the connecting holes 19. The frame 10 may be made of an aluminum material or a plastic material in consideration of light weight and heat dissipation performance, but is not limited thereto.

The reflecting plate 20 is disposed in the seat 13 of the frame 10 and reflects the light from the lamp 30 so that the light is condensed at the outside of the reflecting plate 20. The reflecting plate 20 is positioned with the opening 21 corresponding to the open side 11 of the frame 10 and fixed by fitting both ends into the fitting grooves 15 of the frame 10. The reflecting plate 20 has an extended semi-elliptic cross-section formed along an elliptic line.

The extended semi-elliptic cross-section enables the reflecting plate 20 to have a semi-elliptic section 23 and an extended section 25 formed along the elliptic line. The semi-elliptic section 23 is formed along an elliptic line and disposed in the seat 13 of the frame 10. The extended section 25 is extending along an elliptic line from both ends of the semi-elliptic section 23 and disposed in the seat 13 of the frame 10.

Figure 4:
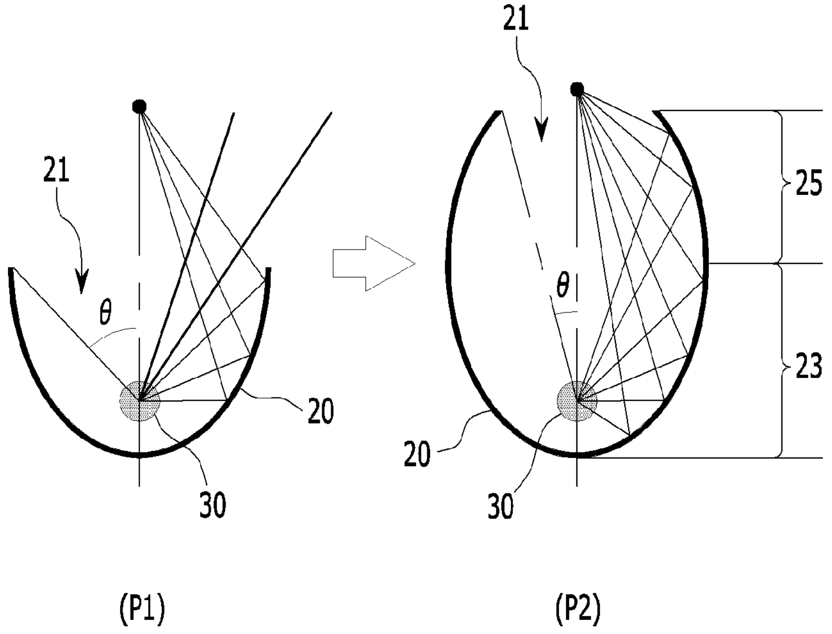
FIG. 4 is a view illustrating the reflection principle of the near-infrared condensing heating unit according to an exemplary embodiment of the present disclosure.

Referring to FIG. 4, the reflecting plate 20 condenses light at the outside of the opening 21 of the reflecting plate 20 by reflecting the diffused light from the lamp 30, thereby forming a light condensing area with high energy density.

The elliptic line may be set such that the light from the lamp 30 forms the light condensing area outside the reflecting plate 20, having the lamp 30 positioned inside the reflecting plate 20.

That is, as indicated in FIG. 4 (P1), when the reflecting plate 20 is formed in a semi-elliptic shape, the opening 21 becomes bigger because the angle 0 made by the end of the reflecting plate 20 and the center of the light condensing area with respect to the lamp 30 become larger. Therefore, the light diffused from the lamp 30 cannot be reflected from the reflecting plate 20 and cannot form a light condensing area with high energy density while being dissipated through the opening 21.

In contrast, as indicated in FIG. 4 (P2), the reflecting plate 20 has the semi-elliptic section 23 and the extended section 25 extending from the semi-elliptic section 23. The opening 21 becomes narrower since the angle θ and the center of the light condensing area become smaller. Therefore, diffused light from the lamp 30 is mostly reflected from the reflecting plate 20, thus increasing the energy density of the light condensing area.

Further, a light condensing rate can be increased by surface treatment on the inner side which is the reflecting side, of the reflecting plate 20. The surface treatment may be performed in various ways, and the reflectivity can be more increased particularly by anodizing.

The lamp 30 is arranged longitudinally inside the reflecting plate 20, and both ends are mounted on the socket 31 on the frame 10 for power supply. The lamp 30 may be a near-infrared lamp emitting near-infrared light.

A near-infrared condensing heater 100 manufactured by using the near-infrared condensing heating unit according to an exemplary embodiment of the present disclosure is described hereafter.

Figure 5:
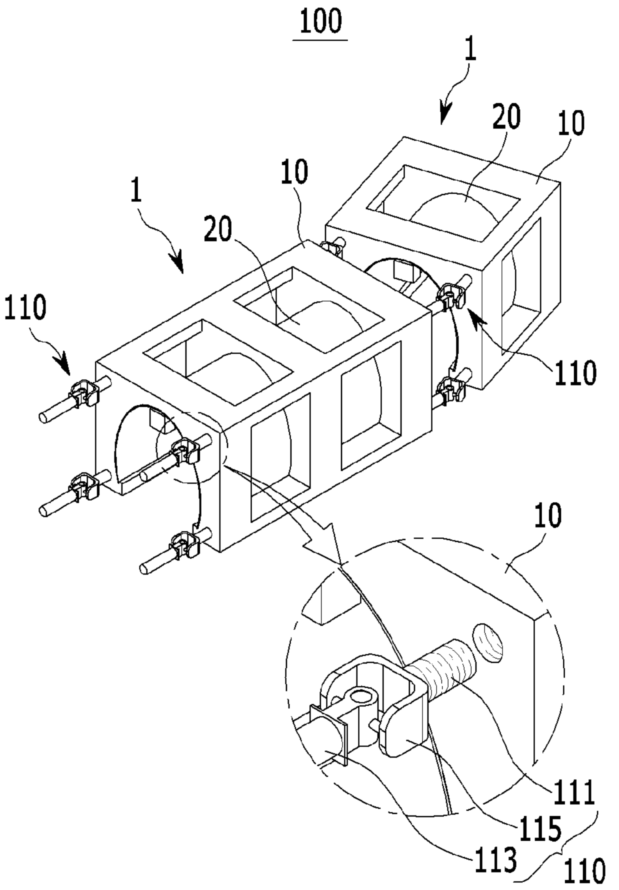
FIG. 5 is an exploded perspective view of a near-infrared condensing heater according to an example manufactured by using the near-infrared condensing heating unit according to an exemplary embodiment of the present disclosure.
Figure 6:
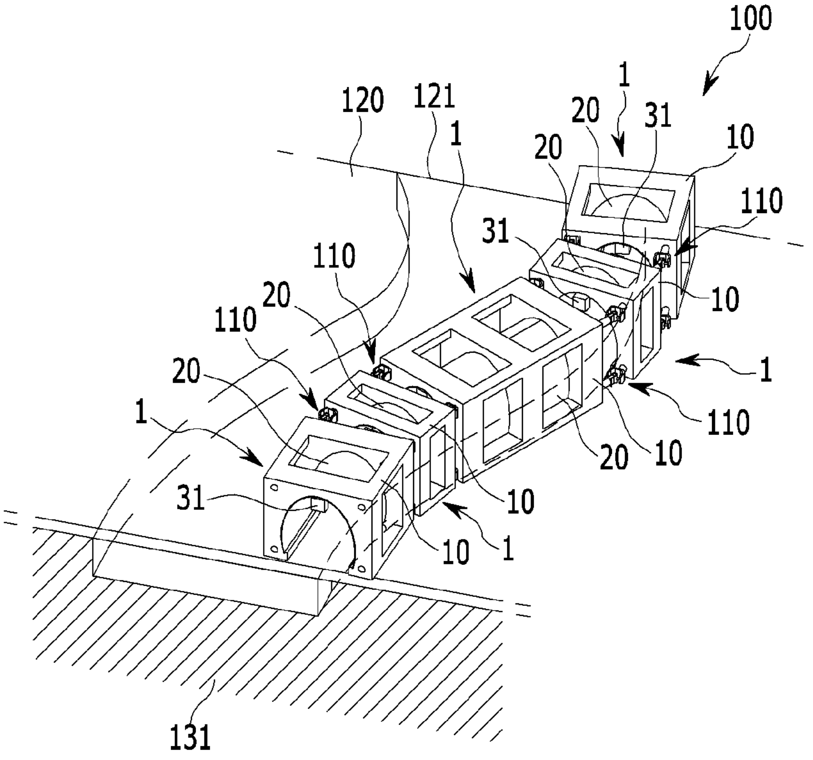
FIG. 6 is a perspective view showing the operation status of the near-infrared condensing heater according to an example manufactured by using the near-infrared condensing heating unit according to an exemplary embodiment of the present disclosure.

FIG. 5 is an exploded perspective view of a near-infrared condensing heater manufactured by using the near-infrared condensing heating unit, and FIG. 6 is a perspective view showing the operation status of the near-infrared condensing heater manufactured by using the near-infrared condensing heating unit.

Referring to FIGS. 5 and 6, the near-infrared condensing heater 100 includes the near-infrared condensing heating unit 1 and connecting joints 110.

The near-infrared condensing heating unit 1 comprises the frame 10, the reflecting plate 20, and the lamp 30 as described in the previous exemplary embodiment.

The connecting holes 19 are formed at the corners of the front and rear sides of the frame 10, and the connecting joints 110 connect at least two or more near-infrared condensing heating units 1 through the connecting holes 19.

The connecting joint 110 includes a first rod 111, a second rod 113, and a universal joint 115. The first rod 111 has one end fitted in the connection hole 19 formed at one frame 10 and the other end fitted in the connection hole 19 formed at another frame 10. The universal joint 115 connects the other ends of the first rod 111 and the second rod 113. The universal joint 115 can relatively rotate between the first rod 111 and the second rod 113. The first rod 111 and the second rod 113 can be thread-fastened to the connecting holes 19, respectively.

A plurality of near-infrared condensing heating units 1 may be arranged in a straight line or a curved line along a portion to be heated on a material, in accordance with length, degree of fitting in the connecting holes 19, and the joint function of the connecting joints 110. Therefore, various shapes of materials can be machined.

A method of forming a panel, using the near-infrared condensing heating unit 1 or the near-infrared condensing heater 100 using the near-infrared condensing heating unit is described hereafter.

Figure 7:
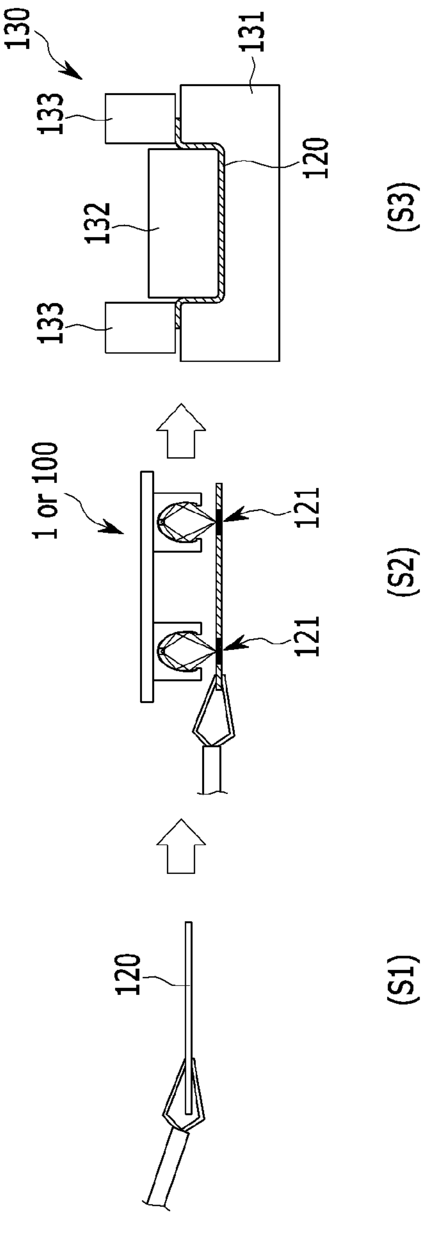
FIG. 7 is a process diagram of a method of forming a panel, using a near-infrared condensing heating unit according to an exemplary embodiment of the present disclosure or a near-infrared condensing heater using the near-infrared condensing heating unit.

FIG. 7 is a process diagram of a method of forming a panel, using a near-infrared condensing heating unit or a near-infrared condensing heater using the near-infrared condensing heating unit.

Referring to FIG. 7, a method of forming a panel places a portion 121 to be formed of a panel 120 at a light condensing area of the near-infrared condensing heating unit 1 or the near-infrared condensing heater 100 (S1)

The portion 121 is locally and instantaneously heated to a predetermined temperature by emitting near-infrared light from the lamp 30 (S2).

The panel 120 is supplied between a die 131 and a punch 132 of a press 130. The panel 120 is then fixed by holders 133 and formed in a predetermined shape (S3). Since the panel 120 is softened by instantaneously heating the portion 121 and placed into the press 130, the cycle time of the forming process can be reduced due to the instantaneous heating.

According to the near-infrared condensing heating unit 1, the near-infrared condensing heater 100 using the near-infrared condensing heating unit 1, and the method of forming a panel using them, a light condensing area can be formed with a high energy density by condensing the light from the near-infrared lamp 3 at the outside of the reflecting plate 20 using the reflecting plate 20 formed in an elliptic line. The portion 121 to be formed of the panel 120 is heated, thus instantaneously heating the panel 120.

The reflecting plate 20 is formed in an elliptic line, having the opening 21 with the semi-elliptic section 23 and the extended section 25 extending in an elliptic line from both ends of the semi-elliptic section 23, thus increasing light-condensing density at the light condensing area.

Further, a light-condensing ratio can be increased by performing surface treatment of anodizing on the reflecting side of the reflecting plate 20.

The reflecting plate 20 freely makes convection with external air through the opening 21. The frame 10 is made of an aluminum material having good heat dissipation performance with the open side 11 exposed the outer side of the reflecting plate 20, thereby preventing overheat of the near-infrared condensing heater.

The near-infrared condensing heater 100 can be further arranged along the portion 121 to be formed of the panel 120 by connecting a plurality of near-infrared condensing heating units 1, using the connecting joints 110. Therefore, the near-infrared condensing heater can locally heat the portion 121 having a complicated curve or having different specifications.

Further, the panel 120 is softened by locally heating the portion 121 before forming by press forming, thus improving formability and the cycle time of the entire process.

While the disclosure has been described in connection with what is presently considered to be practical exemplary embodiments, it is to be understood that the disclosure is not limited to the disclosed embodiments, but, is intended to cover various modifications and equivalent arrangements included within the spirit and scope of the appended claims.

What is claimed is:

1. A near-infrared condensing heating unit comprising:

a frame having an open side at a side and a seat inside;

a reflecting plate, disposed in the seat of the frame, having an opening corresponding to the open side, and having an extended semi-elliptic cross-section along an elliptic line;

a lamp, disposed inside the reflecting plate, with both ends mounted on the frame through sockets; and wherein heat dissipation holes are formed at the sides of the frame, through the sides except the open side, to expose an outer side of the reflecting plate.

2. The near-infrared condensing heating unit of claim 1, wherein fitting grooves are formed at the frame, along both ends of the open side to fit both ends of the reflecting plate.

3. The near-infrared condensing heating unit of claim 1, wherein connecting holes are formed at corners of front and rear sides of the frame, and the frame is, in a unit module, to be connected by connecting joints through the connecting holes.

4. The near-infrared condensing heating unit of claim 1, wherein the reflecting plate has:

a semi-elliptic section disposed in the seat of the frame; and an extended section extending along the elliptic line from both ends of the semi-elliptic section.

5. The near-infrared condensing heating unit of claim 1, wherein the reflecting plate forms the elliptic line and maximizes a light-condensing ratio in a shape further extending from a semi-ellipse.

6. The near-infrared condensing heating unit of claim 1, wherein a surface treatment is performed on the reflecting plate to increase reflectivity.

7. The near-infrared condensing heating unit of claim 6, wherein the surface treatment is anodizing.

8. The near-infrared condensing heating unit of claim 1, wherein the reflecting plate is formed along the elliptic line to form a light condensing area at the outside of the opening of the reflecting plate and to condense the light by reflecting light diffused from the lamp.

9. The near-infrared condensing heating unit of claim 1, wherein the lamp is a near-infrared lamp.

10. A near-infrared condensing heater comprising:

a near-infrared condensing heating unit including a frame having an open side at a side, a seat inside, and connecting holes at the corners of front and rear sides, a reflecting plate disposed in the seat of the frame, having an opening corresponding to the open side, and having an extended semi-elliptic cross-section along an elliptic line, and a lamp disposed inside the reflecting plate, with both ends mounted on the frame through sockets; and connecting joints connecting at least two near-infrared condensing heating units through the connecting holes.

11. The near-infrared condensing heater of claim 10, wherein the connecting joint includes:

a first rod having one end fitted in a connection hole formed at one frame;

a second rod having one end fitted in the connection hole formed at another frame; and a universal joint connecting the other ends of the first rod and the second rod.

12. The near-infrared condensing heater of claim 11, wherein the first rod and the second rod are thread-fastened to the connecting holes, respectively.

13. The near-infrared condensing heater of claim 10, wherein a plurality of near-infrared condensing heating units are arranged in a straight line or a curved line along a portion to be heated on a material, in accordance with a length, a degree of fitting in the connecting holes, and a joint function of the connecting joints.

* * * * *